United States Patent
Gong et al.

(10) Patent No.: US 12,044,293 B2
(45) Date of Patent: Jul. 23, 2024

(54) PLANETARY GEAR TRANSMISSION BOX

(71) Applicant: GUANGDONG ZHAOQING L&V CO. LTD., Guangdong (CN)

(72) Inventors: Hongyu Gong, Guangdong (CN); Yuan Jiang, Guangdong (CN); Xianghuai Qiu, Guangdong (CN); Qingchun Yang, Guangdong (CN)

(73) Assignee: GUANGDONG ZHAOQING L&V CO. LTD., Guangdong (CN)

( * ) Notice: Subject to any disclaimer, the term of this patent is extended or adjusted under 35 U.S.C. 154(b) by 38 days.

(21) Appl. No.: 17/761,926

(22) PCT Filed: Sep. 3, 2020

(86) PCT No.: PCT/CN2020/113242
§ 371 (c)(1),
(2) Date: Mar. 18, 2022

(87) PCT Pub. No.: WO2021/052186
PCT Pub. Date: Mar. 25, 2021

(65) Prior Publication Data
US 2022/0373063 A1    Nov. 24, 2022

(30) Foreign Application Priority Data
Sep. 19, 2019 (CN) .......................... 201910889607.2

(51) Int. Cl.
*F16H 1/46* (2006.01)
*F16H 57/021* (2012.01)
*F16H 57/00* (2012.01)

(52) U.S. Cl.
CPC ............ *F16H 1/46* (2013.01); *F16H 57/021* (2013.01); *F16H 57/0006* (2013.01)

(58) Field of Classification Search
CPC ..... F16H 1/46; F16H 1/28; F16H 3/62; F16H 3/64
See application file for complete search history.

(56) References Cited

U.S. PATENT DOCUMENTS

| 2,932,992 | A | 4/1960 | Larsh |
| 4,043,021 | A | 8/1977 | Mosbacher et al. |

(Continued)

FOREIGN PATENT DOCUMENTS

| CN | 2646326 Y | 10/2004 |
| CN | 201190767 | 2/2009 |

(Continued)

OTHER PUBLICATIONS

International Search Report and Written Opinion for Application No. PCT/CN2020/113242 dated Nov. 12, 2020, with translation (14 pages).

(Continued)

*Primary Examiner* — Derek D Knight
(74) *Attorney, Agent, or Firm* — Michael Best & Friedrich LLP

(57) ABSTRACT

Disclosed is a planetary gear transmission box, comprising a housing portion, a first planetary gear transmission stage, and a second planetary gear transmission stage, wherein the first planetary gear transmission stage comprises a first sun gear (3), a first planetary carrier (5), and a first ring gear; the second planetary gear transmission stage comprises a second sun gear, a second planetary carrier (7), and a second ring gear (6); the first sun gear (3) is connected to an external input element; the first planetary carrier (5) is connected to the second sun gear; the second planetary carrier (7) is connected to an output element; the transmission ratio of the gear transmission box is greater than 25; and the second planetary carrier (7) is directly supported on the housing portion. The locked rotor torque of the gear box is increased, (Continued)

such that the output rotational speed is reduced, and thus a bearing member at the output end can be omitted.

8 Claims, 3 Drawing Sheets

(56) References Cited

U.S. PATENT DOCUMENTS

| | | | |
|---|---|---|---|
| 5,144,849 | A | 9/1992 | Aihara et al. |
| 5,429,558 | A * | 7/1995 | Lagarde .................... F16H 1/46 |
| | | | 74/462 |
| 7,083,538 | B2 | 8/2006 | Szalony |
| 7,329,203 | B2 | 2/2008 | Radinger et al. |
| 8,262,164 | B2 | 9/2012 | Ito et al. |
| 8,376,901 | B2 | 2/2013 | Riester et al. |
| 8,814,742 | B2 | 8/2014 | Uchida et al. |
| 8,876,649 | B2 | 11/2014 | Uchida et al. |
| 9,309,921 | B2 | 4/2016 | Kanai |
| 9,776,483 | B2 | 10/2017 | Shchokin et al. |
| 9,783,027 | B1 | 10/2017 | Elie et al. |
| 9,816,587 | B2 * | 11/2017 | Koike ........................ F16H 1/46 |
| 10,125,855 | B2 | 11/2018 | Yanase |
| 10,344,857 | B2 | 7/2019 | Wang |
| 10,352,432 | B2 | 7/2019 | Richter et al. |
| 10,376,993 | B2 | 8/2019 | Davis et al. |
| 10,704,651 | B2 | 7/2020 | Tsai et al. |
| 11,054,015 | B2 | 7/2021 | Antes et al. |
| 2002/0195291 | A1 | 12/2002 | Nonogaki |
| 2004/0200569 | A1 | 10/2004 | Weiblen et al. |
| 2013/0195545 | A1 | 8/2013 | Tsuchida et al. |
| 2013/0255438 | A1 | 10/2013 | Kieninger |
| 2013/0269305 | A1 * | 10/2013 | Wang ..................... F16H 25/20 |
| | | | 56/14.7 |
| 2015/0024898 | A1 | 1/2015 | Radzevich |
| 2015/0059250 | A1 | 3/2015 | Miu et al. |
| 2015/0283924 | A1 | 10/2015 | Naoufel et al. |
| 2016/0312514 | A1 | 10/2016 | Leonard |
| 2021/0116019 | A1 | 4/2021 | Port |
| 2021/0140516 | A1 | 5/2021 | Gong et al. |

FOREIGN PATENT DOCUMENTS

| | | |
|---|---|---|
| CN | 101680523 A | 3/2010 |
| CN | 101844527 A | 9/2010 |
| CN | 101861442 A | 10/2010 |
| CN | 101868590 A | 10/2010 |
| CN | 102039835 A | 5/2011 |
| CN | 102310789 A | 1/2012 |
| CN | 102350514 A | 2/2012 |
| CN | 102470486 A | 5/2012 |
| CN | 102652047 A | 8/2012 |
| CN | 102791518 A | 11/2012 |
| CN | 202863201 U | 4/2013 |
| CN | 103119333 A | 5/2013 |
| CN | 103363066 A | 10/2013 |
| CN | 103429377 A | 12/2013 |
| CN | 103732348 A | 4/2014 |
| CN | 104121337 A | 10/2014 |
| CN | 204327938 | 5/2015 |
| CN | 205400342 U | 7/2016 |
| CN | 205780789 | 12/2016 |
| CN | 206060455 U | 3/2017 |
| CN | 206072252 | 4/2017 |
| CN | 206145116 | 5/2017 |
| CN | 206626165 U | 11/2017 |
| CN | 107830121 A | 3/2018 |
| CN | 108458090 A | 8/2018 |
| CN | 108591385 A | 9/2018 |
| CN | 208221488 | 12/2018 |
| CN | 110030368 A | 7/2019 |
| CN | 110486424 A | 11/2019 |
| CN | 111207200 A | 5/2020 |
| CN | 211649001 U | 10/2020 |
| CN | 112747066 A | 5/2021 |
| DE | 3418686 | 10/1985 |
| DE | 10015769 A1 | 5/2001 |
| DE | 102006049808 B4 | 2/2012 |
| DE | 102014214382 | 11/2015 |
| DE | 102015216676 | 3/2017 |
| DE | 102016223667 A1 | 5/2018 |
| JP | H02154835 A | 6/1990 |
| JP | 2000080872 A | 3/2000 |
| JP | 2001173733 A | 6/2001 |
| KR | 101221269 B1 | 1/2013 |
| KR | 20180125361 A | 11/2018 |
| WO | 2016006141 A1 | 1/2016 |

OTHER PUBLICATIONS

English translation of International Search Report and Written Opinion for Application No. PCT/CN2021/077030, dated May 11, 2021 (8 pages).
International Search Report with Written Opinion for related Application No. PCT/CN2017/076920 dated Jun. 12, 2017 (14 Pages Including English Translation).
International Search Report and Written Opinion for Application No. PCT/CN2017/092460 dated Oct. 16, 2017 (14 pages including English translation).
International Search Report with Written Opinion for related Application No. PCT/CN2018/118175 dated Feb. 25, 2019 (13 Pages).
International Search Report with Written Opinion for related Application No. PCT/CN2019/083796 dated Jun. 28, 2019 (11 Pages including English Translation).

* cited by examiner

PLANETARY GEAR TRANSMISSION BOX

TECHNICAL FIELD

The present invention relates to the technical field of transmission, more particularly to a planetary gear transmission box.

BACKGROUND ART

As automobiles develop continuously toward intelligence and comfort, electric tailgates have become a trend, and more and more cars have begun to use electric tailgates. Generally, the motor drives the gearbox and then drives the tailgate to open or close.

FIG. 1 is an existing gearbox structure for an electric tailgate. The gearbox has a first-stage planetary gear train PG1 and a second-stage planetary gear train PG2. Each stage of planetary gear train consists of a sun gear, a ring gear and a planet carrier. The power is input by the sun gear of the first-stage planetary gear train PG1, output to the second-stage planetary gear train PG2 via the planetary carrier, and then output by the planet carrier of the second-stage planetary gear train PG2. The planet carrier of the second-stage planetary gear train PG2 is supported on a bearing B.

This type of gearbox is designed with a low transmission ratio, usually lower than 25, so it transmits a low torque, and the output torque is generally less than 5 Nm. Since it transmits a small torque and has low requirements for the strength of the sun gear, the sun gear of at least one stage of planetary gear train can be produced from plastic. In addition, since this type of gearbox has a low transmission ratio, symmetrical gearboxes are usually used.

Therefore, this type of gearbox has the defects of low torque transmission and high cost. In addition, since two gearboxes have to be arranged, a large space will be occupied.

SUMMARY OF THE INVENTION

To solve the above technical problem to a certain extent, the present invention proposes the following technical solutions:

A planetary gear transmission box, comprising a housing portion, a first planetary gear transmission stage, and a second planetary gear transmission stage, wherein the first planetary gear transmission stage comprises a first sun gear, a first planetary carrier, and a first ring gear; the second planetary gear transmission stage comprises a second sun gear, a second planetary carrier, and a second ring gear; the first sun gear is connected to an external input element, the first planetary carrier is connected to the second sun gear, and the second planetary carrier is connected to an output element; an transmission ratio of the gear transmission box is greater than 25.

A planetary gear transmission box, comprising a housing portion, a first planetary gear transmission stage, and a second planetary gear transmission stage, wherein the first planetary gear transmission stage comprises a first sun gear, a first planetary carrier, and a first ring gear; the second planetary gear transmission stage comprises a second sun gear, a second planetary carrier, and a second ring gear; the first sun gear is connected to an external input element, the first planetary carrier is connected to the second sun gear, and the second planetary carrier is connected to an output element; the second planetary carrier is directly supported on the box body.

According to the above two technical solutions, the present invention redesigns the transmission ratio of the gearbox, making it greater than or equal to 25, preferably between 25-30, so as to increase the locked rotor torque of the gearbox. In addition, the output rotation speed decreases due to the increase of the transmission ratio, so the bearing member can be omitted at the output end.

Further, material of the second sun gear is metal.

Further, the housing portion comprises an intermediate housing provided with a radially and inwardly extending support portion, and the first planetary carrier is supported by the support portion.

Further, the housing portion further comprises a first end cover and a second end cover.

Further, a bearing is provided in a central through hole of the first end cover.

Further, a gasket is provided between the first end cover and a planetary gear disposed on the first planetary carrier.

BRIEF DESCRIPTION OF THE DRAWINGS

Other specific features and advantages will be clearly shown in the following description in conjunction with the accompanying drawings, and the description is given as a rough rather than limiting guide, in which.

Figure 1:
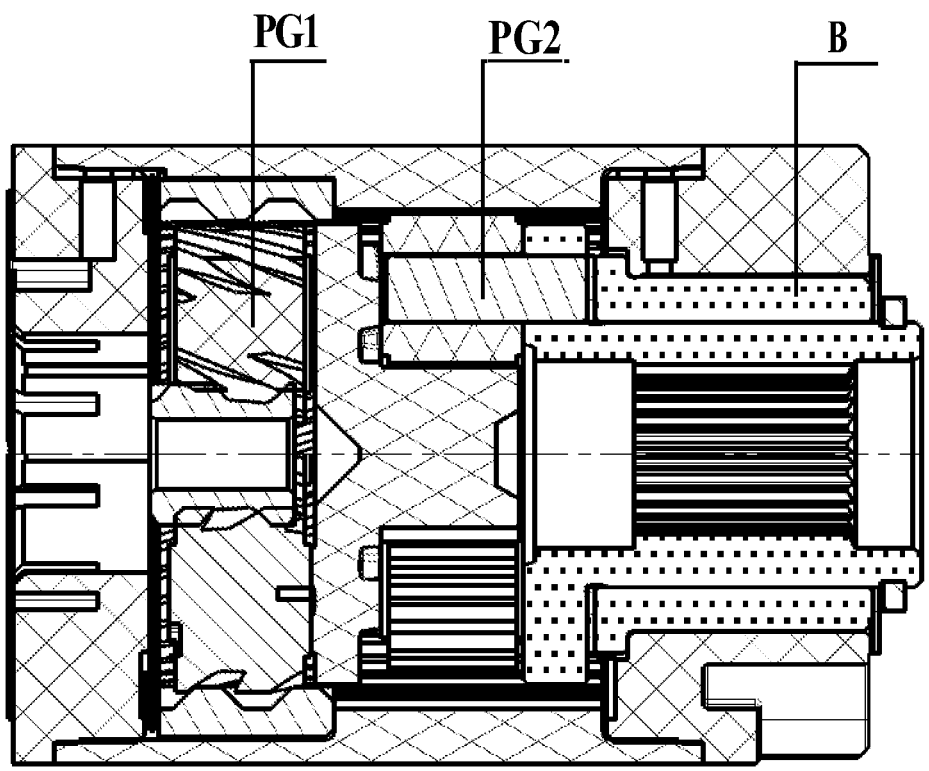
FIG. 1 is a structural diagram of a gearbox in the prior art.

All the drawings are only schematic and are not necessarily drawn to scale. In addition, only those parts necessary to illustrate the invention are shown, and other parts are omitted or only mentioned. That is, in addition to the components shown in the drawings, the invention may also include other components.

DETAILED DESCRIPTION OF THE EMBODIMENTS

The technical solution of the present invention is described in detail below in conjunction with the accompanying drawings.

Figure 2:
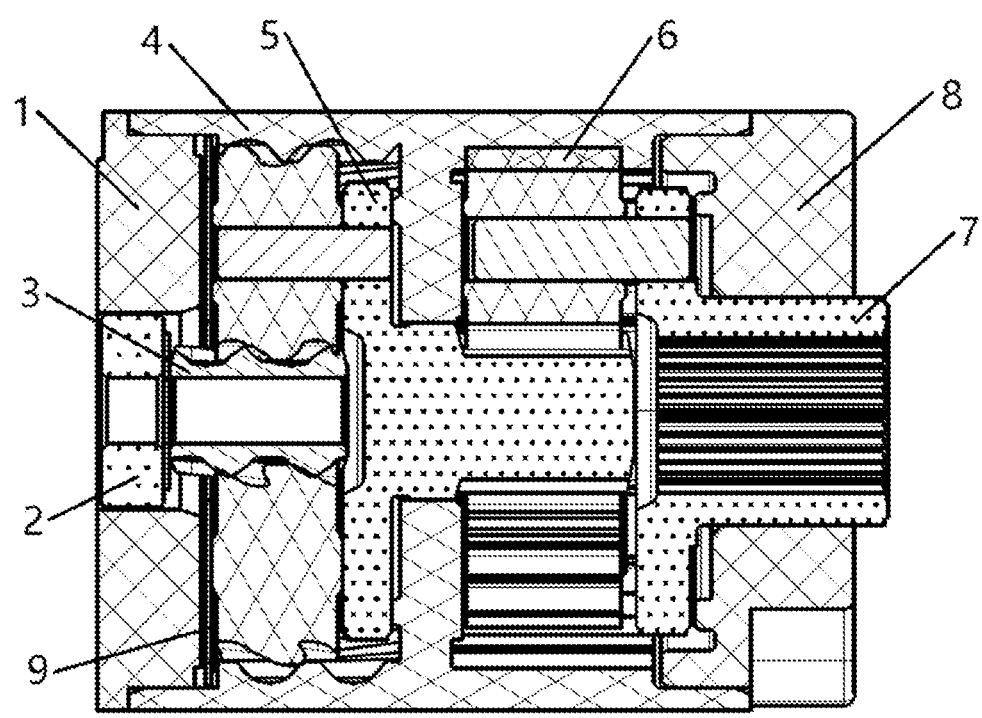
FIG. 2 is a structural diagram of a gearbox according to the present invention.
Figure 3:
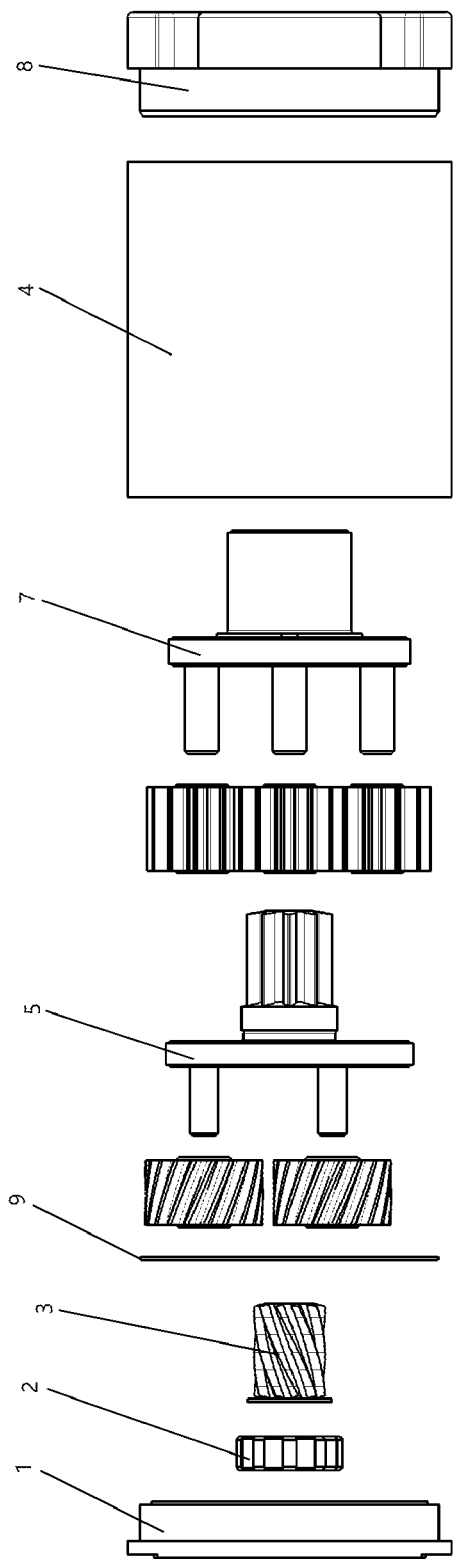
FIG. 3 is an exploded view of components of the gearbox according to the present invention.

Referring to FIGS. 2 and 3, the housing portion of the gearbox in the present invention includes a first end cover 1 on the left side, a second end cover 8 on the right side, and a gearbox intermediate housing 4. The first end cover 1 and the second end cover 8 close the gearbox intermediate housing 4 from both sides respectively, and the transmission components are arranged in the closed space.

The transmission components include two-stage transmission devices. Specifically, the first transmission stage is composed of a first sun gear 3, a first planetary carrier 5, and a first ring gear formed on the inner side of the gearbox intermediate housing 4. The power input by the electric motor is transmitted to the first sun gear 3, then to the first planetary carrier 5 via the planetary gear, and then to the second transmission stage.

The second transmission stage includes a second sun gear, a second ring gear 6 and a second planetary carrier 7. The second ring gear 6 is fixedly arranged on the gearbox intermediate housing 4. As can be seen from FIG. 2, the first planetary carrier 5 and the second sun gear are configured to be one piece. Of course, this is only an exemplary embodiment; the first planetary carrier 5 and the second sun gear may not be integrated as one piece, but made of separate parts respectively. The power is finally output by the second planetary carrier 7.

As can be seen from FIG. 2, a bearing 2 is arranged in the central through hole of the first end cover 1 to support the input shaft. No bearing is arranged in the central through hole of the second end cover 8, and the second planetary carrier 7 is directly supported in the through hole. Compared with the existing transmission box, the transmission box of the present invention has a higher transmission ratio (up to 30 at most), resulting in a lower output rotation speed of the second planetary carrier 7. Due to the lower rotation speed, the wear between the second planetary carrier 7 and the second end cap 2 is relatively reduced. In this way, the bearing may not be provided, which reduces the cost.

In addition, as a preferred embodiment, lubricating oil is arranged between the second planetary carrier 7 and the second end cover 8 to further reduce the wear therebetween.

It can also be seen from FIGS. 2 and 3 that a gasket 9 is arranged between the first end cover 1 and the planetary gear disposed on the first planetary carrier 5 to reduce friction.

As another preferred embodiment of the present invention, referring to FIG. 2, the gearbox intermediate housing 4 of the present invention is provided with a radially and inwardly extending support portion to support the first planetary carrier 5. The support structure enables the operation of the first planetary carrier 5 to be more stable, which reduces the operating noise of the gearbox.

The present invention redesigns the transmission ratio of the gearbox, making it greater than or equal to 25, preferably between 25-30, so as to increase the locked rotor torque of the gearbox, thus making it greater than 5.5 Nm. Accordingly, due to the increase of the torque, in order to increase the strength of structural members, the second sun gear is made of metal materials. Of course, the first sun gear, the first planetary carrier and the second planetary carrier can also be made of metal materials. In addition, the output rotation speed decreases due to the increase of the transmission ratio, so the bearing member can be omitted at the output end.

The present invention has been clearly and completely described with reference to the above schematic embodiments. Those skilled in the art should understand that various other embodiments can be envisaged by modifying the disclosed technical solution without departing from the spirit and scope of the present invention. These embodiments should be understood to fall within the scope of the present invention determined by its claims and any of its equivalent technical solutions.

What is claimed is:

1. A planetary gear transmission box comprising:
   a housing portion; and
   a first planetary gear transmission stage and a second planetary gear transmission stage, wherein the first planetary gear transmission stage includes
      a first sun gear,
      a first planetary carrier, and
      a first ring gear,
   wherein the second planetary gear transmission stage includes
      a second sun gear,
      a second planetary carrier, and
      a second ring gear,
   wherein the first sun gear is connected to an external input element, the first planetary carrier is connected to the second sun gear, and the second planetary carrier is connected to an output element, and
   wherein the housing portion includes an intermediate housing provided with a radially and inwardly extending support portion, and the first planetary carrier is supported by the support portion.

2. The planetary gear transmission box of claim 1, wherein the second sun gear is formed of metal.

3. The planetary gear transmission box of claim 1, wherein the housing portion further includes a first end cover and a second end cover.

4. The planetary gear transmission box of claim 3, wherein a bearing is provided in a central through hole of the first end cover.

5. The planetary gear transmission box of claim 3, wherein a gasket is provided between the first end cover and a planetary gear disposed on the first planetary carrier.

6. The planetary gear transmission box of claim 1, wherein a transmission ratio of the gear transmission box is greater than 25.

7. The planetary gear transmission box of claim 1, wherein the second planetary carrier is directly supported on the housing portion.

8. The planetary gear transmission box of claim 1, wherein the output element is supported by the housing portion without the use of a bearing.

* * * * *